United States Patent
Hahn et al.

(10) Patent No.: US 7,980,734 B2
(45) Date of Patent: Jul. 19, 2011

(54) BULK LIGHT DIFFUSER COMPOSITION

(75) Inventors: Stephen F. Hahn, Lake Jackson, TX (US); Kenneth W. Williams, Lake Jackson, TX (US); Phillip L. Wing, Houston, TX (US); Weijun Zhou, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 278 days.

(21) Appl. No.: 12/442,857

(22) PCT Filed: Sep. 14, 2007

(86) PCT No.: PCT/US2007/020010
§ 371 (c)(1), (2), (4) Date: Mar. 25, 2009

(87) PCT Pub. No.: WO2008/045181
PCT Pub. Date: Apr. 17, 2008

(65) Prior Publication Data
US 2010/0067258 A1    Mar. 18, 2010

Related U.S. Application Data

(60) Provisional application No. 60/849,720, filed on Oct. 5, 2006.

(51) Int. Cl.
*G02B 5/02* (2006.01)
*C08L 53/02* (2006.01)

(52) U.S. Cl. .......... 362/355; 428/1.3; 524/505; 525/338

(58) Field of Classification Search ................ 362/355; 428/1.3; 524/505; 525/338
See application file for complete search history.

(56) References Cited

U.S. PATENT DOCUMENTS

| | | | |
|---|---|---|---|
| 3,333,024 A | 7/1967 | Haefele et al. | |
| 4,196,154 A | 4/1980 | Tung et al. | |
| 4,200,718 A | 4/1980 | Tung et al. | |
| 5,352,744 A | 10/1994 | Bates et al. | |
| 5,612,422 A | 3/1997 | Hucul et al. | |
| 5,645,253 A | 7/1997 | Hoshino | |
| 6,350,820 B1 | 2/2002 | Hahnfeld et al. | |
| 6,376,621 B1 | 4/2002 | Hahnfeld et al. | |
| 6,451,924 B1 | 9/2002 | Hahnfeld et al. | |
| 6,632,890 B1 | 10/2003 | Bates et al. | |
| 6,815,475 B2 | 11/2004 | Donald et al. | |
| 6,908,202 B2 | 6/2005 | Graf et al. | |
| 2002/0061981 A1 * | 5/2002 | Donald et al. | 525/332.9 |

FOREIGN PATENT DOCUMENTS

| | | |
|---|---|---|
| EP | 1310513 | 5/2003 |
| EP | 1634910 | 3/2006 |
| EP | 1634925 | 3/2006 |
| JP | 2007204607 | 8/2007 |

* cited by examiner

*Primary Examiner* — Jeffrey C Mullis

(57) ABSTRACT

The present invention is a bulk light diffuser material based upon a hydrogenated block copolymer, but including a particulate light diffusing component. The material may be in the form of a film, a sheet or a molded article. When present as a sheet having a thickness of 2 millimeters, the sheet has a percent total transmittance of at least 50% and a haze of at least 70%, measured according to the American Society for Testing and Materials (ASTM) standard D 1003.

11 Claims, No Drawings

BULK LIGHT DIFFUSER COMPOSITION

This application claims the benefit of U.S. Provisional Application No. 60/849,720, filed Oct. 5, 2006.

The present invention relates generally to a composition of matter suitable for use in fabricating a polymeric display substrate, preferably a light-diffusing polymeric display substrate. The composition comprises (a) a hydrogenated block copolymer, preferably a substantially fully hydrogenated block copolymer, more preferably a fully hydrogenated block copolymer, and (b) a particulate light diffusing material.

U.S. Pat. No. 6,908,202 discloses bulk light diffuser materials that comprise from 95 percent by weight (wt %) to 99.8 wt % polycarbonate and, conversely, from 0.2 wt % to 5 wt % of a particulate light diffusing material, each weight percentage being based upon total weight of polycarbonate and light diffusing material. A film or sheet prepared from such bulk light diffuser materials has a thickness of from 0.025 millimeter (mm) to 0.5 mm and, when tested in accord with American Society for Testing and Materials (ASTM) standard D 1003, a percent (%) transmittance of at least 70% and a % haze of at least 10%.

Polycarbonate has a use limitation based upon its known tendency to absorb moisture. In addition, polycarbonate has optical performance characteristics such as transmittance, refractive index, and birefringence in bulk light diffuser applications that are less than desired for some commercial applications, particularly those that employ laser light with very short wavelengths (for example near ultraviolet range) or up to approximately 440 nanometers (nm).

U.S. Pat. No. 6,908,202 teaches (column 1, lines 9-19) that optical films or sheet material are commonly used to direct, diffuse or polarize light in backlight computer displays or other display systems. In backlight displays, certain films enhance brightness of the light viewed by a user of the display and allow a system that incorporates the display to consume less power in creating a desired level of on-axis illumination. Certain display systems, for example Liquid Crystal Displays (LCD), desirably include a diffusing component to improve uniformity in illumination.

U.S. Pat. No. 6,815,475 discloses fully or substantially fully hydrogenated block copolymers such as rigid hydrogenated block copolymers with greater than 90% diene hydrogenation and greater than 95% vinyl aromatic (or arene such as styrenic) hydrogenation, in each case based upon total available double bonds or unsaturation in the block copolymers prior to hydrogenation. The hydrogenated block copolymers have a number average molecular weight ($M_n$) of from 30,000 to 150,000 and may be triblock, multiblock, tapered block or star block copolymers such as SBS, SBSBS, SIS, SISIS and SISBS (where "S" is polystyrene, "B" is polybutadiene and "I" is polyisoprene). Such copolymers reportedly exhibit transparency to light at visible wavelengths while possessing excellent physical properties at both standard and elevated temperatures. According to column 2, lines 38-49, these properties include high glass transition temperature ($T_g$), low water absorption and good strength. U.S. Pat. No. 6,815,475 does not, however, define "high", "low" or "good".

U.S. Pat. No. 6,815,475 does, however, define "sheet" as having a thickness of 20 mils (0.51 mm) or more and "film" as having a thickness of less than 20 mils (0.51 mm). Such sheets can be used in various applications that demand optical clarity such as flat panel displays, liquid crystal displays and rear projection television screens.

Skilled artisans recognize that percent total transmittance (% TT) and percent of haze (% H), as determined in accord with ASTM D1003, represent common measures of optical properties of materials such as transparency and light diffusion properties. Skilled artisans also recognize that ASTM D-570 serves as an accepted test for determining water absorption via immersion for twenty-four (24) hours (hrs) at a temperature of 74 degrees Fahrenheit (° F.) (23.3° centigrade. (° C.)).

U.S. Pat. No. 6,451,924 includes teachings related to high data density optical media discs with a retardation of less than 25 nm per 0.6 mm of substrate (birefringence of less than 0.000042), and a water absorbance of less than 0.05% as measured according to ASTM D 570. Birefringence retardation measurement involves placing a molded DVD disc substrate between crossed polarizers and quarter wave plates (oriented in opposition) and taking a measurement 20 mm from an injection gate of the disc using light from a 633 nm laser. Column 12, line 58 through column 13, line 8 includes teachings relative to calculating retardation and birefringence. Disc substrates comprise a hydrogenated block copolymer, preferably a rigid hydrogenated block copolymer with hydrogenation levels equal to those disclosed in U.S. Pat. No. 6,815,475 cited above.

U.S. Pat. No. 6,376,621 provides hydrogenated block copolymers of styrene and isoprene and suggests use of such copolymers in preparing optical media disks with extremely low birefringence values. U.S. Pat. No. 6,376,621 defines "birefringence" as double refraction, noting that it is a form of optical distortion determined by differences in index of refraction in materials through which visible light passes.

U.S. Pat. No. 6,350,820 also discusses optical media and notes that hydrogenated block copolymers are transparent to light at visible wavelengths and possess excellent properties at both standard and elevated temperatures. Such properties include high $T_g$, low water absorption, flexibility, excellent melt processability and surprisingly negligible birefringence. U.S. Pat. No. 6,350,820 teaches use of such copolymers in production of optical media devices and components thereof including a transparent substrate, a protective layer or an information layer.

A first aspect of the present invention is a bulk light diffuser material comprising from 80 wt % to 99.9 wt % of a rigid, substantially fully hydrogenated block copolymer and, conversely, from 0.1 wt % to 20 wt % of light diffusing particles that have a refractive index that differs from that of the block copolymer matrix by at least (greater than or equal to ($\geq$)) 0.02 units, each wt % being based upon total weight of hydrogenated block copolymer and light diffusing particles, the block copolymer constituting a continuous polymer phase and the light diffusing particles constituting a disperse phase within the continuous polymer phase, the block copolymer comprising at least two distinct blocks of hydrogenated vinyl aromatic polymer, and at least one block of hydrogenated conjugated diene polymer, the hydrogenated block copolymer being further characterized by a water absorption of less than or equal to ($\leq$) 0.1%, preferably $\leq$0.075% and more preferably $\leq$0.05%, a transmittance of more than (>) 90%, and a density of 0.92-0.95 g/cc, whereby a two millimeter thick sheet comprising the bulk light diffuser material has a percent total transmittance (% TT) of at least 50% and a percent haze (% H) (ASTM D-1003) of at least 70%.

Refractive index, nominally "n", for a material represents a ratio of velocity of light in a reference medium (typically a vacuum) to velocity of light in the material. Skilled artisans recognize that refractive index, being a ratio between two values having the same units of measure, is a dimensionless number. By way of illustration, a light diffusing particle refractive index that differs from a block copolymer matrix refractive index by ≧0.02 units could be less than or equal to (≦) 1.49 or ≧1.53 if the block copolymer matrix refractive index is 1.51.

A second aspect of the present invention is a backlight display device that comprises an optical source for generating light; an optional light guide for guiding the light therealong including a reflective surface for reflecting the light out of the light guide; and a film or sheet that comprises the bulk light diffuser material of the first aspect and is receptive to light either directly from the optical source or indirectly from the light guide In addition to use in a backlight display device, the bulk light diffuser materials of the present invention may be used to prepare a transparent or translucent, protective cover for display devices including, but not limited to, a plasma screen, a liquid crystal display, a light emitting diode device, and a cathode ray tube display apparatus.

As used throughout this specification, definitions presented in succeeding paragraphs or elsewhere in the specification, have meanings ascribed to them where first defined.

When ranges are stated herein, for example from 2 to 10, both end points of the range (2 and 10) are included within the range unless otherwise specifically excluded.

Bulk light diffuser materials of the present invention have a % TT (ASTM D-1003) of ≧50%, preferably ≧60%, more preferably ≧65%, still more preferably ≧70%, even more preferably ≧75% and most preferably ≧80%. Such bulk light diffuser materials also have a % H (ASTM D-1003) of ≧70%, preferably ≧80%, and more preferably ≧85%, still more preferably ≧90% and most preferably ≧95%. A practical upper limit for % Haze is 100%. Skilled artisans recognize that % TT values of 100% are very difficult to obtain where there is a refractive index difference between a matrix material such as a rigid, substantially fully hydrogenated block copolymer and diffusing particles, for example organic diffusing particles, dispersed within the matrix material. Such % TT and % H values are for a molded plate or extruded bulk light diffuser material having a thickness of two (2) mm. Skilled artisans recognize that as plate thickness increases, % TT decreases and % H values increase because of increased scattering of light in the plate by the diffusing particles as optical path length through the plate increases. Nonetheless, some instruments may show an indicated value in excess of 100% for standard haze measurement. As a practical matter, skilled artisans typically regard such values as artifacts of instrument design and equate such higher numbers with 100%.

As noted in U.S. Pat. No. 6,908,202, the teachings of which are incorporated herein by reference, especially those found at column 3, lines 20 through 37, suitable light diffusing particles may comprise organic or inorganic materials, or mixtures thereof. Choice of light diffusing particles involves a balance between a desirable refractive index relative to the rigid, substantially fully hydrogenated block copolymer and minimizing any significant adverse effects upon physical properties desired in the rigid, substantially fully hydrogenated block copolymer. Examples of suitable light diffusing organic materials include polystyrene, poly(acrylates); poly (alkyl methacrylates), for example poly(methyl methacrylate) (PMMA); poly(tetrafluoroethylene) (PTFE); silicones, for example hydrolyzed poly(alkyl trialkoxysilanes) and polymethyl silsesquioxane; and mixtures comprising at least one of the foregoing organic materials, wherein the alkyl groups have from one to twelve carbon atoms. In choosing an organic light diffusing particle, an additional consideration in order to maintain particulate integrity of the light diffusing particle is to select a material that resists deformation during fabrication or processing of the rigid, substantially fully hydrogenated block copolymer based diffuser board into its final shape. For polymeric light diffusing particles, this can be accomplished by choosing materials that do not undergo substantial dimensional changes at temperatures used to melt process the rigid, substantially fully hydrogenated block copolymer (for example 250° C.), especially by choosing particles that are crosslinked prior to addition to the block copolymer matrix material. Examples of suitable light diffusing inorganic materials include materials comprising talc, calcium carbonate, antimony, silicon, titanium, zirconium, barium, and zinc, for example the oxides or sulfides of the foregoing such as silica, zinc oxide, antimony oxide and mixtures comprising at least one of the foregoing inorganic materials. The inorganic materials may, if desired, also be treated with an organic coating.

Light diffusing particle selection depends, at least in part, on difference in refractive index between the particle and the substantially fully hydrogenated block copolymer matrix. In order to provide sufficient diffusion properties, preferably while simultaneously limiting, more preferably eliminating, light transmission deterioration, the refractive index of the diffusing particle must, as noted above, differ from that of the copolymer matrix by ≧0.02 units, preferably by ≧0.03 units and more preferably by ≧0.05 units. In addition, the diffusing particle desirably has an average or mean diameter within a range of from 0.1 micrometer (μm) and 100 μm, preferably from 0.1 μm to 50 μm, and more preferably from 0.1 μm to 20 μm. Skilled artisans recognize that some variation in particle size occurs for a given batch of diffusing particles. Depending upon how one manufactures the diffusing particles, variation in particle size may appear, for example, as any of a monomodal distribution (single distribution peak, for example a Gaussian distribution or a Poisson distribution), a bimodal distribution (two distribution peaks), a multimodal distribution (three or more distribution peaks). In each case, distribution peaks appear in a two dimensional plot of particle sizes with respect to total particle count within a given batch of diffusing particles.

Rigid, substantially fully hydrogenated block copolymers suitable for use in bulk light diffuser materials of the present invention are suitably prepared in accord with U.S. Pat. No. 6,632,890, the teachings of which are incorporated herein by reference. The block copolymers preferably include at least two distinct blocks of hydrogenated polymerized vinyl aromatic monomer (for example styrene, vinyl toluene, alpha-methyl styrene, or tert-butyl styrene) that alternate with at least one block of hydrogenated polymerized conjugated diene monomer (for example 1,3-butadiene, 2-methyl-1,3-butadiene, 2-methyl-1,3-pentadiene and/or isoprene). Skilled artisans can readily substitute other styrenic monomers or other diene monomers for those described above. Such block copolymers have a total number average molecular weight ($Mn_t$) of from 30,000 to 120,000 wherein each hydrogenated vinyl aromatic polymer block (A) has a number average molecular weight ($Mn_a$) of from 5,000 to 50,000 and each hydrogenated conjugated diene polymer block has a number average molecular weight ($Mn_b$) of from 4,000 to 110,000. U.S. Pat. No. 6,632,890 also discloses hydrogenated pentablock copolymers with a $Mn_t$ of from 30,000 to 200,000, a $Mn_a$ of from 10,000 to 100,000 and a $Mn_b$ of from 2,000 to 50,000. Determine the molecular weight values relative to homopolymer standards using gel permeation chromatography (GPC) on the precursor (unhydrogenated) block copolymer.

Both U.S. Pat. Nos. 6,632,890 and 6,815,475, the teachings of which are also incorporated herein by reference, note that suitable hydrogenated block copolymers result from hydrogenation of block copolymers including triblock copolymers, multiblock copolymers, tapered block copolymers and star block copolymers such as SBS, SBSBS, SIS, SISIS, and SISBS (wherein "S" is polystyrene, "B" is polybutadiene and "I" is polyisoprene). The block copolymers contain at least one triblock segment, but may also include any number of additional blocks wherein those blocks may be attached at any point to the triblock polymer's backbone structure.

U.S. Pat. No. 6,350,820, the teachings of which are also incorporated herein by reference, defines a "block", at column 2, lines 58-67, as a polymeric segment of a copolymer that exhibits microphase separation from a structurally or compositionally different polymeric segment of the copolymer. U.S. Pat. No. 6,350,820 notes that microphase separation occurs due to the incompatibility of the polymeric segments within the block copolymer and suggests that separation of block segments can be detected by the presence of distinct glass transition temperatures.

U.S. Pat. No. 6,350,820 defines "rigid hydrogenated block copolymers" at column 3, lines 1-12, "as having a weight ratio of hydrogenated conjugated diene polymer block to hydrogenated vinyl aromatic polymer block of 40:60 to 5:95, preferably from 35:65 to 10:90, more preferably from 30:70 to 15:85, based on the total weight of the hydrogenated conjugated diene polymer block and the hydrogenated vinyl aromatic polymer block". U.S. Pat. No. 6,350,820 specifies that total weight "of the hydrogenated vinyl aromatic polymer blocks and the hydrogenated conjugated diene polymer block (s) is typically at least 80 weight percent, preferably at least 90, and more preferably at least 95 weight percent of the total weight of the hydrogenated copolymer".

U.S. Pat. No. 6,350,820 details preparation of block copolymers at column 4, lines 22-51, the teachings of which are incorporated herein by reference. In general preparation proceeds via anionic polymerization using a carbanionic initiator such as sec-butyl lithium or n-butyl lithium reacting with an anionically polymerizable monomer, the growing polymer chain being terminated by a cationic species or reacted via coupling using a divalent coupling agent such as 1,2-dibromoethane, dichlorodimethylsilane or phenylbenzoate. Anionic polymerization can also be initiated by the reaction of an anionically polymerizable monomer with a difunctional anionic initiator such as 1,3-bis(1-phenylethyl) benzene that is treated with an organolithium compound in accord with U.S. Pat. Nos. 4,200,718 and 4,196,154, both of which are also incorporated herein by reference.

U.S. Pat. No. 6,350,820 discusses procedures for hydrogenating block copolymers at column 4, line 52 through column 8, line 23. All teachings of U.S. Pat. No. 6,350,820 specifically addressed in this Application are incorporated herein by reference. In general, hydrogenation removes sites of unsaturation in both the polymerized diene monomer block and the polymerized styrenic monomer block and employs a hydrogenation catalyst such as a metal catalyst supported on an inorganic substrate (for example palladium (Pd) on barium sulfate per U.S. Pat. No. 5,352,744 or nickel (Ni) on kieselguhr in accord with U.S. Pat. No. 3,333,024). Hydrogenation may also occur with use of hydrogen and a heterogeneous catalyst such as those described in U.S. Pat. Nos. 5,352,744, 5,612,422 and 5,645,253. Such a heterogeneous catalyst may comprise a metal crystallite supported on a porous silica substrate wherein the metal is a Group VIII (Periodic Table of the Elements as shown in CRC Handbook of Chemistry and Physics, 77$^{th}$ Edition (1996-1997)) metal such as nickel, cobalt, rhodium, ruthenium, palladium or platinum.

Preparation of Catalyst Supports and Catalysts, while not within the Scope of the present invention, is detailed in U.S. Pat. No. 6,350,820 at column 6, line 30 through column 7, line 21. The teachings of each of the references cited in this paragraph, in preceding paragraphs or in succeeding paragraphs are incorporated herein to the maximum extent permitted by law.

The rigid, substantially fully hydrogenated block copolymers evidence optical clarity over a thickness range of from 0.1 mm to 50 mm. Conversion of the rigid, substantially fully hydrogenated block copolymers of the present invention into films, sheets or other fabricated shapes preferably occurs via use of conventional procedures such as injection molding, sheet molding, sheet extrusion. If desired, patterns may be embossed or imprinted on external surfaces of such films, sheets or other fabricated shapes to promote or improve optical properties (for example light diffusion ability) or for aesthetics or both. In addition, the external surfaces may be modified by conventional procedures, one of which is application of a coating, to enhance or tailor barrier, adhesion, optical or other functional attributes of such films, sheets or other fabricated shapes.

Diffuser plate preparation for use in a liquid crystal display (LCD) device requires one to account for probable dimensional changes in the plate during use in order to ensure that the diffuser plate remains substantially in its original position in the device during such use. Dimensional changes may arise from the thermal expansion of the polymeric bulk light diffuser material, or from environmental interactions such as moisture absorption.

An approximation of diffuser plate dimensional changes stems from a relationship that describes an edge gap that forms between a diffuser plate or sheet and an edge of a cabinet that contains the diffuser plate. An equation for edge gap approximation is as follows:

$$\text{Gap}=0.7 \text{ mm}+[L(T_2-T_1)CTE]+(LW_a).$$

In the equation, 0.7 mm is a constant that represents machine tolerance or permitted variability of part dimensions, $T_1$ represents temperature (in degrees Celsius or ° C.) prior to use (typically room temperature (nominally 25° C.)) and $T_2$ represents highest operating or use temperature in ° C., L is diffuser board length in millimeters (mm), CTE is polymeric matrix coefficient of linear thermal expansion in micrometers per meter degree Celsius (µm/m° C.), and $W_a$ equals weight percent water absorption, based upon ASTM D-570. For purposes of edge gap approximation, consider CTE for a polymer used for the polymeric matrix to be a constant. In other words, each polymer will have what may be considered a unique CTE.

Makers of LCD-containing devices desire diffuser plates with as little dimensional change or expansion as possible during heating that occurs as the device moves from ambient temperature to operating temperature (for example $T_2$). A practical maximum expansion or gap is within a range of from 2.5 mm to 8 mm for a LCD panel that has a diagonal length of 32 inches (813 mm). While such makers may tolerate use of bulk light diffuser materials that have low levels of moisture absorption provided the LCD panel does not exceed the practical maximum expansion, they would not object to reducing or even eliminating levels of moisture absorption.

Bulk light diffuser materials of the present invention are based upon a rigid, substantially fully hydrogenated block copolymer which, as noted above, has a very low moisture absorption of, for example, ≦0.1%, preferably ≦0.075% and more preferably ≦0.05%, as measured according to ASTM D 570. By way of contrast, polycarbonate (PC) materials used in making PC-based bulk light diffuser materials have a higher level of moisture absorption, for example 0.15% for Calibre™ 303 (The Dow Chemical Company, density of 1.20 grams per cubic centimeter (g/cc)). Polymethylmethacrylate (PMMA) resins have a level of moisture absorption that exceeds that of PC, for example 0.40% for Plexiglas™ DR-101 (Altuglas International).

The bulk light diffuser materials of the present invention also have a CTE that, when factored into the Gap equation noted above, allow one to fabricate a 32 inch (813 mm) (diagonal measure) LCD panel with an expansion of no more than 8 mm.

CTE, water absorption and calculated Gap equation numbers for bulk light diffuser material matrix polymers suitable for use in fabricating a 32 inch (813 mm) LCD panel are as follows: a substantially fully hydrogenated block copolymer as in Examples (Ex) 1-4 below—CTE=148 µm/m° C., water absorption=0.05%, and Gap equation number of 7.1 mm; PC(Calibre™ 303)–CTE=59 µm/m° C., water absorption=0.16%, and Gap equation number=4.3 mm; and PMMA (Plexiglas™ DR-101)–CTE (reported by T. A. Osswald and G. Menges in *Materials Science of Polymers for Engineers*, T. A. Osswald and G. Menges, Hanser Publishers, Munich, 1996)=70 µm/m° C., water absorption=0.4% and Gap equation number 6.8 mm.

Analytical Procedures

Determine specific gravity in grams per cubic centimeter (g/cm³) in accord with water displacement comparison designated by ASTM Test Method D792.

For Ex 1-4 and Comp Ex A-I, use a haze meter equipped with a 12 volt (V) halogen light source (Haze Meter Model NDH 300A, Nippon Denshoku) to measure % TT and calculate % Haze in accord with ASTM D-1003. Define "haze" as percent of diffuse light transmittance, with respect to total light transmittance, that deviates from an incidence angle by more than 2.5 degrees.

For all remaining Ex, use a Haze-Gard Plus™ haze meter (BYK Gardner) in place of the Model NDH 300A haze meter.

ASTM D-1003 suggests that one should use a bidirectional scattering distribution function (BSDF) in accord with ASTM E-2387-05 for materials having a % Haze in excess of 30%. Skilled artisans recognize, however, that few practitioners adopt BSDF measurements as such measurements do not provide a ready comparison between different materials. By way of contrast, % Haze and % TT determinations with an instrument such as the Haze-Gard Plus haze meter find wide acceptance and provide consistent data sets even for highly diffusing (% Haze in excess of 30%) translucent materials such as polymeric films and polymeric sheets.

Use a vitreous silica dilatometer operating at a heating rate of 10° C./minute over a temperature range of from −30° F. (−34° C.) to 30° F. (−1° C.) to determine coefficient of linear thermal expansion (CTE) over the temperature range in accord with ASTM D696-98.

The following examples illustrate, but do not limit, the present invention. All parts and percentages are based upon weight, unless otherwise stated. All temperatures are in ° C. Examples (Ex) of the present invention are designated by Arabic numerals and Comparative Examples (Comp Ex) are designated by capital alphabetic letters. Unless otherwise stated herein, "room temperature" and "ambient temperature" are nominally 25° C.

EX 1-4 AND COMP EX A-B

Use a twin screw extruder (Werner Pfleider, WMP ZSK-25, length to diameter ratio (L/D) of 42 and a screw diameter of 25 mm) to convert a rigid, substantially fully hydrogenated block copolymer as a matrix polymer and, for Ex 1-4 and Comp Ex B, but not for Comp Ex A which contains no diffusing particles, an amount (two percent by weight (wt %) for Comp Ex B and Ex 2, 3 and 4 and three wt % for Ex 1) of diffusing particles into a polymer melt for Comp Ex A or a polymer melt compound for each of Comp Ex B and Ex 1-4. In the polymer melt compounds, the diffusing particles form a disperse phase and the rigid, substantially fully hydrogenated block copolymer forms a continuous phase. The twin screw extruder has six (6) barrel zones with set point temperatures of 180° C., 220° C., 230° C., 240° C., 245° C., and 245° C. and a die temperature of 245° C. The polymer melt or polymer melt compound that exits the extruder has a melt temperature of approximately 250° C. Convert the polymer melt or polymer melt compound, whichever is appropriate, to polymer or polymer compound pellets using an underwater pelletizer. Feed the polymer or polymer compound pellets to an injection molding apparatus (Creator Model CI-100 injection molding apparatus) to convert the polymer into a sheet or plate having a nominal thickness of one millimeter (mm), two mm or three mm as shown in Table I below. Each wt % noted in this paragraph is based upon combined weight of rigid, substantially fully hydrogenated block copolymer and diffusing particles.

The rigid, substantially fully hydrogenated block copolymer, an experimental copolymer prepared by The Dow Chemical Company from a SBSBS pentablock copolymer having, prior to hydrogenation, a total copolymer Mn of 60,000, a styrene (S) content of 85 wt % and a butadiene (B) content of 15 wt %, in each case based upon total polymer weight prior to hydrogenation and, when taken together, totaling 100 wt %, the B content comprising 90 wt % 1,4-butadiene and 10 wt % 1,2-butadiene, in each case based upon total butadiene block weight and, in combination, totaling 100 wt %, has a density of 0.95 grams per cubic centimeter (g/cc or g/cm³), a glass transition temperature ($T_g$) of 132° C., a water absorption percentage (ASTM D570) of less than 0.05 percent (%) and a styrene hydrogenation level of 99.5%, based upon total styrene present prior to hydrogenation. The substantially fully hydrogenated block copolymer has a nominal refractive index of 1.51.

Determine $T_g$ of the rigid, substantially fully hydrogenated block copolymer via dynamic mechanical analysis of a solid rectangular bar formed (compression molded at a temperature of 250° C.) from the copolymer and having a length of 45 millimeters (mm), a width of 12.5 mm and a thickness of 3.2 mm using an ARES Rheometer (TA Instruments) equipped with an auto-strain adjustment to maintain measurement torque between 200 gram-centimeters and 900 gram-centimeters, an oscillatory frequency of 1 radian per second, an initial strain of 0.1%, a temperature range of from −100° C. to 160° C. and a rate of temperature increase of 3° C. per minute. Designate tan δ peak temperature from the dynamic mechanical analysis as $T_g$ of the rigid, substantially fully hydrogenated block copolymer.

The diffusing particles are either organic (Comp Ex B and Ex 1-3) or inorganic (Ex 4). The organic particles used in Comp Ex B are cross-linked, mono-dispersing, acrylic particles having an average particle size of 5 micrometers (µm), a density of 1.19 grams per cubic centimeter (g/cm³), a refractive index of 1.49, and a coefficient of variation or CV (standard deviation divided by mean expressed as a percent) value of nine percent (9%) (commercially available from Soken Chemical & Engineering Co. Ltd. under the trade designation CHEMISNOW™ MX-500). The organic particles used in Ex 3 are crosslinked, mono-dispersing, acrylic particles having an average particle size of 10 μm, a density of 1.19 g/cm³, a refractive index of 1.49, and a CV value of 9 (commercially available from Soken Chemical & Engineering Co. Ltd. under the trade designation CHEMISNOW™ MX-10). The organic particles used in Ex 1-2 are cross-linked polystyrene (PS) particles having an average particle size of 10 μm, a density of 1.09 g/cm³, and a refractive index of 1.59 (commercially available from Soken Chemical & Engineering Co. Ltd. under the trade designation CHEMISNOW™ SGP-50C). The inorganic particles used in Ex 4 are calcium carbonate (CaCO₃) particles having an average particle size of 4.6 μm (particle size range of from 0.5 μm to 10 μn) (commercially available from An Tai Micron Industry Co. Ltd.).

Evaluate the sheet or plate for % Haze and % TT in accord with the procedure outlined above. Summarize evaluation results in Table I below.

COMP EX C-E

Replicate the procedure for Ex 1-4 and Comp Ex A-B, but change the matrix polymer to a polycarbonate (PC) resin (CALIBRE™ 201-15, The Dow Chemical Company) and extrude PC (Comp Ex C) or a PC compound (Comp Ex D-E) at a melt temperature of 280° C. Comp Ex C is neat PC resin and contains no light diffusing particles. Comp Ex D contains 2 wt % of CaCO₃; and Comp Ex E contains 2 wt % of MX-10 particles. Evaluate resulting plates for % Haze and % TT as for Ex 1-4 and Comp Ex A-B and summarize evaluation results in Table I below.

TABLE I

| Ex/Comp Ex No | % H (1 mm) | % H (2 mm) | % H (3 mm) | % TT (1 mm) | % TT (2 mm) | % TT (3 mm) |
|---|---|---|---|---|---|---|
| A | 1.1 | 1.4 | 2.2 | 92.8 | 92.3 | 92.4 |
| B | 43.2 | 57.2 | 68.5 | 91.3 | 91.8 | 91.8 |
| 1 | 83.4 | 87.2 | 87.9 | 89.4 | 79.1 | 68.5 |
| 2 | 82.58 | 86.8 | 87.8 | 89.5 | 82.3 | 74.8 |
| 3 | 79.6 | 84.4 | 86.1 | 94.4 | 94 | 92.8 |
| 4 | 86.5 | 88 | 88.3 | 75.4 | 62 | 51.3 |
| C | 0.7 | 1.1 | 2.2 | 91.2 | 91.1 | 90.8 |
| D | 83.1 | 87 | 87.9 | 77.4 | 63.7 | 51.3 |
| E | 84.3 | 87.1 | 87.8 | 90 | 79.4 | 66.7 |

The data in Table I demonstrate that while a neat substantially fully hydrogenated block copolymer (Comp Ex A) and a neat PC resin (Comp Ex C) have similar, but unsatisfactory in terms of % H, properties without a diffusing particle and similar properties when loaded with CaCO₃ as an inorganic diffusing particle (Ex 4 versus Comp Ex D), measured properties differ significantly when the diffusing particle is an organic material such as an MX-10 cross-linked acrylic material (Ex 3 versus Comp Ex E). Halving the cross-linked acrylic material particle size from that of Ex 3 (10 μm) to that of Comp Ex B (5 μm) has little effect upon % TT, but a significant effect upon % H. Both CaCO₃ as inorganic diffusing particles and certain organic diffusing particles (for example cross-linked PS particles) yield satisfactory % H and % TT values (both greater than 70%) at certain plate thicknesses (for example 1 mm for CaCO₃ (Comp Ex C and Ex 4), 1 mm and 2 mm for 2 wt % cross-linked PS particles (Ex 1) and at 1 mm, 2 mm and 3 mm for 3 wt % cross-linked PS particles (Ex 2). In other words, the data presented in Table I suggest that one may obtain a desirable combination of optical properties such as haze and transmittance by adding a plurality of light diffusing particles, either polymeric or inorganic, as a disperse phase to a continuous or matrix phase comprising a substantially fully hydrogenated block copolymer.

COMP EX F-J

Evaluate five (5) commercial diffuser plates that have a thickness of 2 mm for % Haze and % TT as in Ex 1-4 and Comp Ex A-B. Summarize the results in Table II below. All data represent an average of five (5) measurements and each measurement is accurate within plus or minus three units. Comp Ex F, commercially available from Tsutsunaka Plastic Industry Co. Ltd. under the trade designation SUNLOID™ is a polycarbonate (PC) matrix with proprietary diffusing particles dispersed therein. Comp Ex G, obtained by disassembling a SONY liquid crystal display (LCD) TV, comprises a metallocene catalyzed cyclic olefin copolymer (mCOC) matrix with unknown diffusing particles dispersed therein. Comp Ex H, commercially available from Asahi Chemical Company is a PMMA matrix with polystyrene (PS) diffusing particles dispersed therein. Comp Ex I, commercially available from Mitsubishi Chemical Company and recently introduced into the LCD market, is also a PMMA matrix with PS diffusing particles dispersed therein. Comp Ex J, commercially available from ENTIER Technology Co. Ltd. under the trade designation ENTIER™ EMS is a styrene-maleic anhydride (SMA) resin with polypropylene (PP) diffusing particles dispersed therein.

TABLE II

| Comp Ex No | % H | % Total Transmittance |
|---|---|---|
| F | 89.7 | 54.1 |
| G | 90.8 | 59.1 |
| H | 89.6 | 66.2 |
| I | 89.3 | 52.7 |
| J | 90.8 | 62.8 |

The data in Table II represent % H and % Total Transmittance values for a range of current commercial diffuser plates and provide a baseline for comparison with diffuser plate prepared using bulk light diffuser materials of the present invention.

A comparison of the 2 mm thick diffuser plate data in Table I with the data in Table II suggests that compositions of the present invention, especially those of Ex 1-3 with significantly higher % TT values than those of Comp Ex F-J, have utility in preparing diffuser plates. Skilled artisans recognize that, as between two % TT values, a higher % TT value tends to offer a higher efficiency of light utilization for display device components (for example a diffuser plate) and other light management applications.

EX 5-8

Replicate Ex 1-4 and Comp Ex A-B, but use varying amounts of a crosslinked polystyrene material (SBX-8, Seikisui Plastics Co. Ltd, Japan, mean particle size of eight (8) micrometers (μm) and refractive index of 1.59) as a diffusing material in place of the diffusing particles used in Ex 1-4 and Comp Ex B and change the extruder to an 18 millimeter (mm) Liestritz twin screw extruder. The amounts of diffusing material are, respectively, 2 wt %, 1.5 wt %, 1 wt %, and 0.5 wt %, in each case based upon combined weight of substantially fully hydrogenated block copolymer and diffusing material. Instead of injection molding as in Ex 1-4, compression mold plates having thicknesses as shown in Table IV below. Prior to compression molding, dry polymer compound pellets in a vacuum oven operating at a set point temperature of 110° C. for a period of two (2) hours. Place dried polymer compound pellets in a TETRAHEDRON™ brand compression molding apparatus (commercially available from Tetrahedron Associates, San Diego, Calif.) using a mold temperature set point of 250° C. and an applied pressure of 150 pounds per square inch (psi) (1.03 megapascals (MPa). Summarize % H and % TT data in Table III below.

TABLE III

| Example No. | % H (1.2 mm) | % H (1.8 mm) | % TT (1.2 mm) | % TT (1.8 mm) |
|---|---|---|---|---|
| 5 | 101* | 102* | 88.4 | 80.1 |
| 6 | 100 | 101* | 90.1 | 85 |
| 7 | 99.2 | 101* | 90.6 | 87.3 |
| 8 | 94.6 | 97.3 | 92 | 89.2 |

*as noted above, read values in excess of 100 as 100.

The data in Table III demonstrate that one can tailor optical properties (% H and % TT) by varying amounts of a diffusing particle with a refractive index that differs from the refractive index of the substantially fully hydrogenated block copolymer by at least 0.02, in this case by 0.08. With amounts of at least one wt % (Ex 7), one achieves substantially complete diffusion of light in either a 1.2 mm thick sample or a 1.8 mm thick sample while retaining a % TT of at least 80%.

EX 9-10

Replicate Ex 7 (1 wt % diffusing particle content), but change the diffusing particle size to six μm for Ex 9 (SBX-6, Seikisui Plastics Co. Ltd, Japan) and 12 μm for Ex 10 (SBX-12, Seikisui Plastics co. Ltd, Japan). Summarize % H and % TT data for Ex 9 and 10 together with Ex 7 in Table IV below.

TABLE IV

| Example No. | % H (1.2 mm) | % H (1.8 mm) | % TT (1.2 mm) | % TT (1.8 mm) |
|---|---|---|---|---|
| 7 (SBX-8) | 99.2 | 101* | 90.6 | 87.3 |
| 9 (SBX-6) | 100.2* | 101* | 90.6 | 84.7 |
| 10 (SBX-12) | 96.3 | 99.1 | 90.8 | 88.3 |

The data in Table IV demonstrate that diffusing particle size affects % Haze and, to some extent, % TT. Based upon the data, % H increases in an inverse relationship to diffusing particle size, whereas % TT undergoes minimal increase, at least at a plate thickness of 1.2 mm, as diffusing particle size increases. One may therefore tailor desired optical properties (% H and, to some extent, % TT) by varying diffusing particle size.

EX 11-12

Replicate Ex 5-8, but change type and amount of diffusing particle. For Ex 11, use 2 wt % of a 5% crosslinked poly (methylmethacrylate-co-ethylene glycol dimethacrylate) polymer (PMMA) (Sigma-Aldrich, Lot No. 11005PC, mean particle size of 7 μm and refractive index of 1.49). For Ex 12, use a mixture of 2 wt % of the same diffusing particle as in Ex 16 and 0.5 wt % of crosslinked polystyrene polymer (Ex 8). Summarize % Haze and % TT data for Ex 8, Ex 11 and Ex 12 in Table V below.

TABLE V

| Example No. | % Haze (1.2 mm) | % Haze (1.8 mm) | % TT (1.2 mm) | % TT (1.8 mm) |
|---|---|---|---|---|
| 8 | 91.7 | 96.4 | 90.9 | 89 |
| 11 | 79 | 82.7 | 91.8 | 91.7 |
| 12 | 95.9 | 98.8 | 91.7 | 90.2 |

The data in Table V demonstrate that while either a crosslinked polystyrene or a crosslinked PMMA diffusing particle yields satisfactory optical properties (% Haze and % TT) by itself, a combination of the two provides even better results. The data suggest further tailoring opportunities for selecting a desired combination of optical properties by varying types and amounts of diffusing particles.

Ex 13-18

Replicate Ex 5-10 above, but prepare 2 mm and 3 mm plates for testing via injection molding as in Ex 1-4 above. Ex 13-18 contain the same type and amount of diffusing particles as, respectively, Ex 5-10. Summarize optical property (% TT and % H) data in Table VI below.

TABLE VI

| Example No | % H (2 mm) | % H (3 mm) | % TT (2 mm) | % TT (3 mm) |
|---|---|---|---|---|
| 13 | 102* | 102* | 77.7 | 66.6 |
| 14 | 102* | 102* | 81.8 | 71 |
| 15 | 101* | 102* | 87.2 | 79.7 |
| 16 | 95.7 | 99.7 | 90.3 | 87.7 |
| 17 | 101* | 102* | 85.3 | 75 |
| 18 | 99 | 101* | 88.6 | 83.3 |

Compared to the optical properties of plates used as diffuser boards for flat panel display in Table II (Comp Ex E-I), the data presented in Table VI demonstrate plates fabricated from Ex 13-18 (2 mm thickness), except for Ex 16, have very high haze and can provide an almost complete diffusion of light (that is, % H>99%), and at the same time, have very high percentage of light transmission of at least 80%. Both optical properties represent significant improvements and benefits for the disclosed invention to be used as bulk light diffuser applications.

The % H and % TT data for 2 mm thickness plates prepared by injection molding (Table VI) are nearly identical to data for plates having a slightly smaller thickness, but prepared by compression molding (Table III and IV). This suggests that method of fabrication has little, if any, effect upon diffusing plate optical properties. The % H and % TT data for 1.2 mm thickness plates (Tables III and IV) further suggest that compositions of the present invention can be used to manufacture bulk light diffuser plates that have a substantially smaller thickness than the commercial diffuser plates noted in Comp Ex F-J. A smaller thickness leads, in turn, to cost savings for materials used by bulk light diffuser manufacturers.

Similar results are expected with other substantially fully hydrogenated block copolymers as well as blends of such substantially fully hydrogenated block copolymers with a substantially fully hydrogenated polystyrene homopolymer as well as with various diffusing particles or diffusing particle combinations, all of which are disclosed above. In particular, bulk light diffuser compositions based on polymers block copolymer substrates formed from block copolymers that have, prior to hydrogenation, a polymerized styrene content of from 40 wt % to 95 wt %, based upon block copolymer weight, are expected to provide useful bulk light diffuser substrates. Similarly, substantially fully hydrogenated block copolymers that have been modified by the addition of species or conventional additives that protect substantially fully hydrogenated block copolymers from one or more of thermal oxidation and degradation due to exposure to ultraviolet light are also expected to provide utility in this application. One may further modify the bulk light diffuser composition by adding a small amount of other additives, for example a fluorescent whitening agent, to tailor the optical brightness and chromaticity of diffuser films or sheets. One may also add processing aids or low molecular weight diluents in order to modify properties of the substantially fully hydrogenated block copolymer or blend thereof with a substantially fully hydrogenated polystyrene homopolymer without departing form this invention's spirit or scope. In addition, one may treat surfaces of a bulk light diffuser substrate with coatings to enhance resistance to physical or chemical insults, or to modify optical properties, again without departing from this invention's spirit or scope. One may also mold plates or sheets in a textured mold or cast films or sheets on an embossing roller to achieve a textured surface so that further modification of optical properties may be achieved by tailoring surface roughness of a bulk light diffuser article.

The invention claimed is:

1. A bulk light diffuser material comprising from 80 percent by weight to 99.9 percent by weight of a rigid, substantially fully hydrogenated block copolymer and from 0.1 percent by weight to 20 percent by weight of light diffusing particles that have a refractive index that differs from that of the hydrogenated block copolymer matrix by greater than or equal to 0.02, each weight percentage being based upon total weight of hydrogenated block copolymer and light diffusing particles, the block copolymer constituting a continuous polymer phase and the light diffusing particles constituting a disperse phase within the continuous polymer phase, the block copolymer comprising at least two distinct blocks of hydrogenated vinyl aromatic polymer, and at least one block of hydrogenated conjugated diene polymer, whereby a two millimeter thick sheet comprising the bulk light diffuser material has a percent total transmittance of at least 50% and a percent haze (ASTM D-1003) of at least 70%.

2. The bulk light diffuser material of claim 1, wherein the percent haze is less than or equal to 100 percent.

3. The bulk light diffuser material of claim 1, wherein the substantially fully hydrogenated block copolymer comprises alternating styrenic polymer blocks and conjugated diene polymer blocks.

4. The bulk light diffuser material of claim 3, wherein the substantially fully hydrogenated block copolymer is at least one of a hydrogenated styrene-isoprene-styrene block copolymer, a hydrogenated styrene-isoprene-styrene-isoprene block copolymer, a hydrogenated styrene-isoprene-styrene-isoprene-styrene block copolymer, a hydrogenated styrene-butadiene-styrene block copolymer, a hydrogenated styrene-butadiene-styrene-butadiene block copolymer, a hydrogenated styrene-butadiene-styrene-butadiene-styrene block copolymer, a hydrogenated styrene-butadiene-styrene-isoprene block copolymer and a hydrogenated styrene-butadiene-styrene-isoprene-styrene block copolymer.

5. A polymeric film comprising the bulk light diffuser material of claims 1, the film having a thickness of less than 20 mils (0.5 millimeters).

6. A polymeric sheet comprising the bulk light diffuser material of claim 1, the sheet having a thickness of at least 20 mils (0.5 millimeters).

7. The bulk light diffuser material of claim 1, wherein the light diffusing particle is an inorganic material.

8. The bulk light diffuser material of claim 1, wherein the light diffusing particle is a crosslinked polymeric particle.

9. The bulk light diffuser material of claim 1, wherein the light diffusing particles have a refractive index that differs from that of the hydrogenated block copolymer matrix by greater than or equal to 0.03.

10. The bulk light diffuser material of claim 1, wherein the light diffusing particles have an average particle size within a range of from 0.1 micrometer to 100 micrometers.

11. A backlight display device that comprises an optical source for generating light; an optional light guide for guiding the light therealong including a reflective surface for reflecting the light out of the light guide; and a film or sheet that comprises the bulk light diffuser material of claim 1 and is receptive to light either directly from the optical source or indirectly from the light guide.

* * * * *